(12) United States Patent
Grass

(10) Patent No.: US 7,567,570 B2
(45) Date of Patent: Jul. 28, 2009

(54) RELIABLE TRANSPORT OF TDM DATA STREAMS OVER PACKET NETWORKS

(75) Inventor: John Grass, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 1036 days.

(21) Appl. No.: 10/101,420

(22) Filed: Mar. 19, 2002

(65) Prior Publication Data

US 2003/0179752 A1 Sep. 25, 2003

(51) Int. Cl.
*H04L 12/56* (2006.01)
(52) U.S. Cl. .............. 370/394; 370/235; 370/352; 714/749; 709/231
(58) Field of Classification Search ......... 370/351–356, 370/394, 516–519, 328–329, 231, 235; 709/230–237; 714/15, 18, 748, 749
See application file for complete search history.

(56) References Cited

U.S. PATENT DOCUMENTS

| | | | | |
|---|---|---|---|---|
| 6,085,252 A * | 7/2000 | Zhu et al. | ............. | 709/231 |
| 6,289,224 B1 * | 9/2001 | Boxall et al. | ............. | 455/517 |
| 6,477,164 B1 * | 11/2002 | Vargo et al. | ............. | 370/356 |
| 6,510,219 B1 * | 1/2003 | Wellard et al. | ............. | 379/221.01 |
| 6,606,306 B1 * | 8/2003 | Lin et al. | ............. | 370/261 |
| 6,757,245 B1 * | 6/2004 | Kuusinen et al. | ............. | 370/230 |
| 6,757,367 B1 * | 6/2004 | Nicol | ............. | 379/90.01 |
| 6,850,769 B2 * | 2/2005 | Grob et al. | ............. | 455/515 |
| 7,304,951 B2 * | 12/2007 | Rhee | ............. | 370/235 |
| 2003/0012212 A1 * | 1/2003 | Earnshaw et al. | ............. | 370/428 |
| 2003/0031210 A1 * | 2/2003 | Harris | ............. | 370/516 |

\* cited by examiner

*Primary Examiner*—Aung S Moe
*Assistant Examiner*—Habte Mered
(74) *Attorney, Agent, or Firm*—Townsend and Townsend and Crew LLP

(57) ABSTRACT

Systems and methods are presented for transporting a TDM data stream over a packet network, involving buffering an input TDM data stream to fill a data frame on a sending side, assigning a sequence number to the data frame, sending the data frame in a packet across the network to a receiving side, setting a timer corresponding to the data frame, storing a copy the data frame in a sending side buffer, receiving the packet and removing the data frame at the receiving side, sending an acknowledgement frame to the sending side, buffering received data frames in a sequence order in a receive buffer, and sending a data frame with a lowest sequence number to an output TDM data stream, wherein if an acknowledgement frame is not received before an expiration of the timer, a copy of a corresponding data frame is resent to the receiving side.

14 Claims, 4 Drawing Sheets

RELIABLE TRANSPORT OF TDM DATA STREAMS OVER PACKET NETWORKS

BACKGROUND OF THE INVENTION

1. Field of the Invention

The present invention relates generally to the field of packetized data transmission, and more particularly, to a system and method for reliable transport of Time Division Multiplexed (TDM) data streams over packet networks.

2. Description of the Related Art

Digital voice communication networks are generally connection-oriented, that is, there is a dedicated circuit connecting the two end-points. The voice signal is sampled at a fixed rate and the samples are then transmitted over the dedicated circuit. The transmission of the samples is guaranteed to occur over the dedicated circuit, since there is no other data traffic to interfere. A standard voice circuit uses a 64 kb/s data path. Multiple 64 kb/s circuits can be multiplexed onto a single hardware transmission channel by alternating the point in time that each circuit can access the higher-speed channel. This technique is known as Time Division Multiplexing (TDM). The term "TDM circuit" is commonly used to refer to a connection-oriented circuit that has a certain dedicated bandwidth between the two end-points, and has synchronous data transfer.

When data is sent across a TDM circuit, the data samples that are sent from one end are reproduced in the same sequential order at the receiving end. Additionally, the timing between the data samples is consistent, i.e. any transmission delay is applied equally to all data samples.

In contrast, the Internet Protocol (IP) is an unreliable, connectionless delivery mechanism for data transfer across networks. The IP protocol defines the basic unit of data transfer (a packet) and the specification of the data format. In addition, the IP protocol provides the routing functionality needed to determine which path to send data across a network.

As defined and implemented, the IP protocol provides no guarantee of success in transferring data (i.e. it is unreliable), and there is no dedicated connection between the source and destination nodes (i.e. it is connectionless). Currently, most data networks are IP packet-based networks.

There are many applications that use data communication networks that expect to have data transported across TDM circuits. As such, these applications cannot tolerate the insertion of a packet-based network between the end-points. Since a packet-based network is unreliable, the data packets may be lost, duplicated, arrive out of order or arrive at variable time intervals. Thus, if the data passes over a packet network, the receiving end is unable to adequately recreate the TDM data stream for the application. FIG. 1 illustrates a TDM to IP to TDM network implementation.

One of the most popular protocols used to achieve reliable packet delivery over packet networks is TCP (Transmission Control Protocol). TCP utilizes the technique of positive acknowledgement with retransmission. In other words, an acknowledgement packet is sent back to the sending node from the recipient for every packet that is successfully received. The sending node waits a specified amount of time to receive the acknowledgement. If the sending node fails to receive an acknowledgement within the specified time period, the sending node retransmits the same packet. A new timer is set until an acknowledgement is received for the retransmitted packet. This process continues until an acknowledgement is received, or the sending node eventually gives up after a certain number of retries. TCP varies the amount of time the sending node waits for acknowledgements based on the network conditions.

In order to overcome the problem with packets arriving out of order, TCP assigns a sequence number to each packet so that the recipient can properly order the packets and remove any duplicates. Also, in order to increase network bandwidth efficiency, TCP permits the sending of multiple packets prior to receiving an acknowledgement for the first packet. In fact, TCP can vary the number of packets to be sent prior to receiving an acknowledgement, depending on network load conditions.

While TCP can solve some of the issues associated with reliably transporting TDM data across a packet network, it does not address the requirement that the data must be successfully regenerated at fixed time interval at the destination. In other words, TCP does not guarantee when a packet will be ready for the TDM application, only that the packet will be successfully received at some point.

Voice over IP (VoIP) communication systems are specialized implementations of TDM data transmission over packet networks. The specific TDM data in this instance is voice samples. Human voice can tolerate some packet loss in a network since voice communications are not seriously impacted if brief intervals of a call are missing. Also, lost frames could simply be replaced by repeating previous frames to avoid periods of silence. Moreover, due to the nature of speech, lost frames may be replaced by extrapolating the data from the previous frames or by interpolating between previous and future frames. While this will not reproduce the original data exactly, it will provide some improvement over periods of silence.

The most important considerations for VoIP systems is that the voice data is transmitted real-time and that any delays are minimized. So while VoIP systems do maintain the delivery time requirements for TDM data, they do not successfully address the requirements of guaranteeing the delivery of all the data.

SUMMARY OF THE INVENTION

In general, the present invention is a system and method for providing reliable transport of TDM data over a packet network, while maintaining a constant TDM data stream at a receiving end. According to the present invention, the first step in the transmission of a TDM stream over a packet network is to buffer an incoming data stream until a frame of data of a predetermined size is filled. The frame is then assigned a sequence number.

The TDM data frame having an assigned sequence number is put into a packet and sent towards the destination across the packet network. At this time, a timer is set for the sent data frame, and a copy of the data frame is stored in a buffer in case it needs to be retransmitted. After a date frame is transmitted, the next data frame is processed as soon as it is filled with data from the data stream.

On the receiving side, a packet is received from the packet network. The data frame is first removed from the packet. A data frame acknowledgement is placed in a packet which is returned for each successfully received data frame (i.e. no errors detected within the frame). The receiving side maintains a buffer of incoming data frames. Data frames are placed in a fixed-size buffer in their sequence order. As a new frame is added to the buffer, the data frame with the lowest sequence number (i.e. at the "bottom" of the buffer) is sequentially transmitted on a TDM data stream at the receiving end. Missing or corrupted data frames are represented in the buffer by a null set frame (i.e. all bits zero, or all bits one). If this data frame is eventually received or is retransmitted prior to reaching the end of the buffer, the null frame is replaced. Otherwise, the null frame is transmitted on the TDM data stream.

When the data frame timer has expired, and no acknowledgement has been received, the data frame is re-sent in a new packet. If an acknowledgement has arrived prior to the timer expiring, the timer is cancelled, as there is no need to retransmit that data frame.

Alternatively, the receiving side can keep track of the sequence numbers of the received frames, and send a negative acknowledgement if a predetermined number of frames have been received after a missing frame. The sending side then resends the missing frame, even if the corresponding timer has not expired.

Furthermore, common frame data patterns may be "coded", i.e. sent as codes corresponding to the actual data, in order to reduce the amount of data that needs to be sent over the packet network.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1:
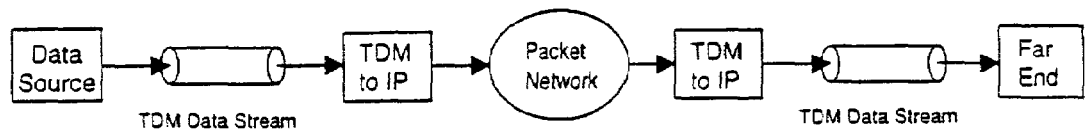
FIG. 1 is a diagram of a network having TDM data streams connected via a packet network.
Figure 2:
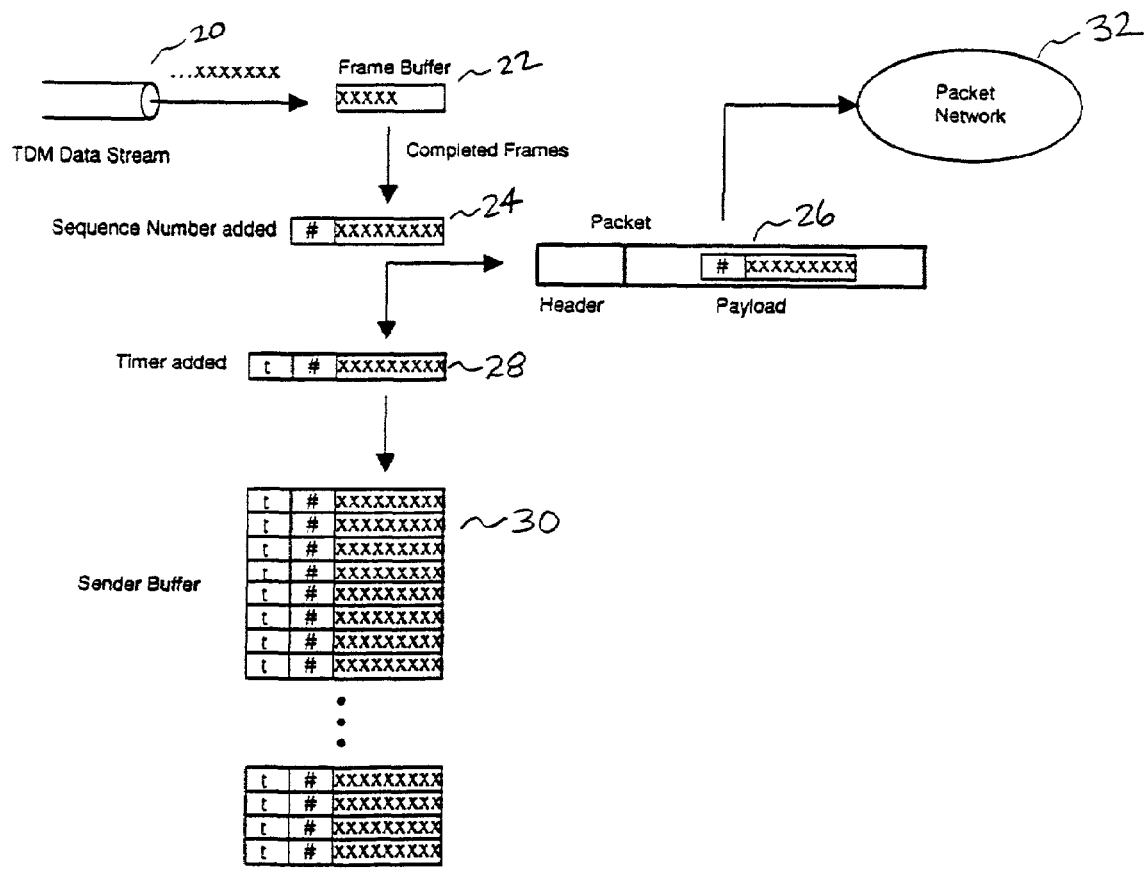
FIG. 2 is a diagram of the present invention illustrating the processing of TDM data for transmission over a packet network.

In general, the present invention is a system and method for providing reliable transport of TDM data over a packet network, while maintaining a constant TDM data stream at a receiving end. As illustrated in the diagram of FIG. 2, the first step in the transmission of a TDM stream 20 over a packet network 32 is to buffer an incoming data stream until a frame of data 22 of a predetermined size is filled. The frame 24 is then assigned a sequence number. There is a trade-off in setting the size of the frame 22. A small frame size helps to diminish the overall network delay. However, a large sized frames reduce the percentage of packet overhead, i.e. provides better bandwidth utilization.

The TDM data frame 24 having an assigned sequence number is put into a packet 26 and sent towards the destination across the packet network 32. At this time, a timer is set for the sent data frame, and a copy of the data frame 28 is stored in a buffer 30 in case it needs to be retransmitted. The retransmission timer should generally be set to a time greater than twice the round-trip transmission delay (time for the packet to be sent, and an acknowledgement packet to return) PLUS the expected processing at the receiving end (usually negligible).

The expected transmission delay can be estimated or measured using external test measurement tools such as ping messages. More sophisticated systems may automatically calculate the delay.

After a date frame is transmitted, the next data frame is processed as soon as it is filled with data from the data stream. Unlike the "sliding window" technique used in TCP, the processing of subsequent data frames is never limited. The number of data frames that can be unacknowledged is not constrained by a fixed number (the "window size" in TCP), so that each data frame is always immediately transmitted when available.

Figure 3:
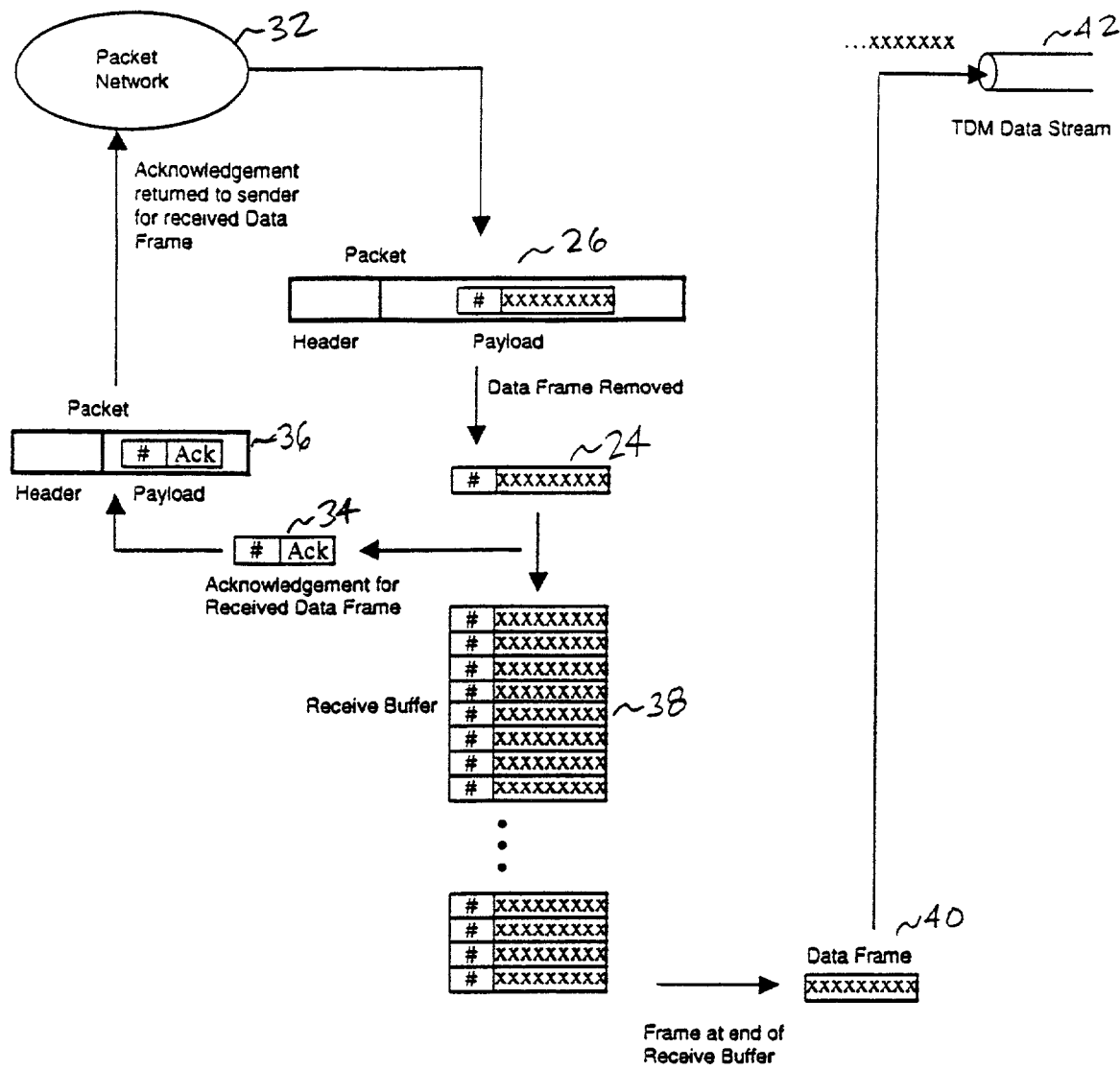
FIG. 3 is a diagram of the present invention illustrating processing received data frames.

FIG. 3 illustrates the processing of the present invention at the receiving end. A packet 26 is received from the packet network 32. The data frame 24 is first removed from the packet 26. A data frame acknowledgement 34 is placed in a packet 36 which is returned for each successfully received data frame (i.e. no errors detected within the frame). A missing packet at the receiving end can be detected by tracking the sequence numbers of received packets. If an expected data frame does not arrive after a certain number of subsequent frames have been received, a negative acknowledgement is sent to the transmitting end. This speeds up the retransmission of a missing packet, which otherwise would have only been retransmitted after the timer had expired at the transmitting node.

As discussed below, if the receive buffer is properly configured, there may not be a need to speed up the retransmission of a missing data frame. However, since it is difficult to predict network conditions that may cause the receive buffer to be too small, receiving an earlier retransmission may be beneficial.

The receiving side maintains a buffer 38 of incoming data frames. Data frames are placed in a fixed-size buffer in their sequence order. As a new frame 24 is added to the buffer 38, the data frame 40 with the lowest sequence number (i.e. at the "bottom" of the buffer) is sequentially transmitted on a TDM data stream 42 at the receiving end. Missing or corrupted data frames are represented in the buffer by a null set frame (i.e. all bits zero, or all bits one). If this data frame is eventually received or is retransmitted prior to reaching the end of the buffer 38, the null frame is replaced. Otherwise, the null frame is transmitted on the TDM data stream 42.

Figure 4:
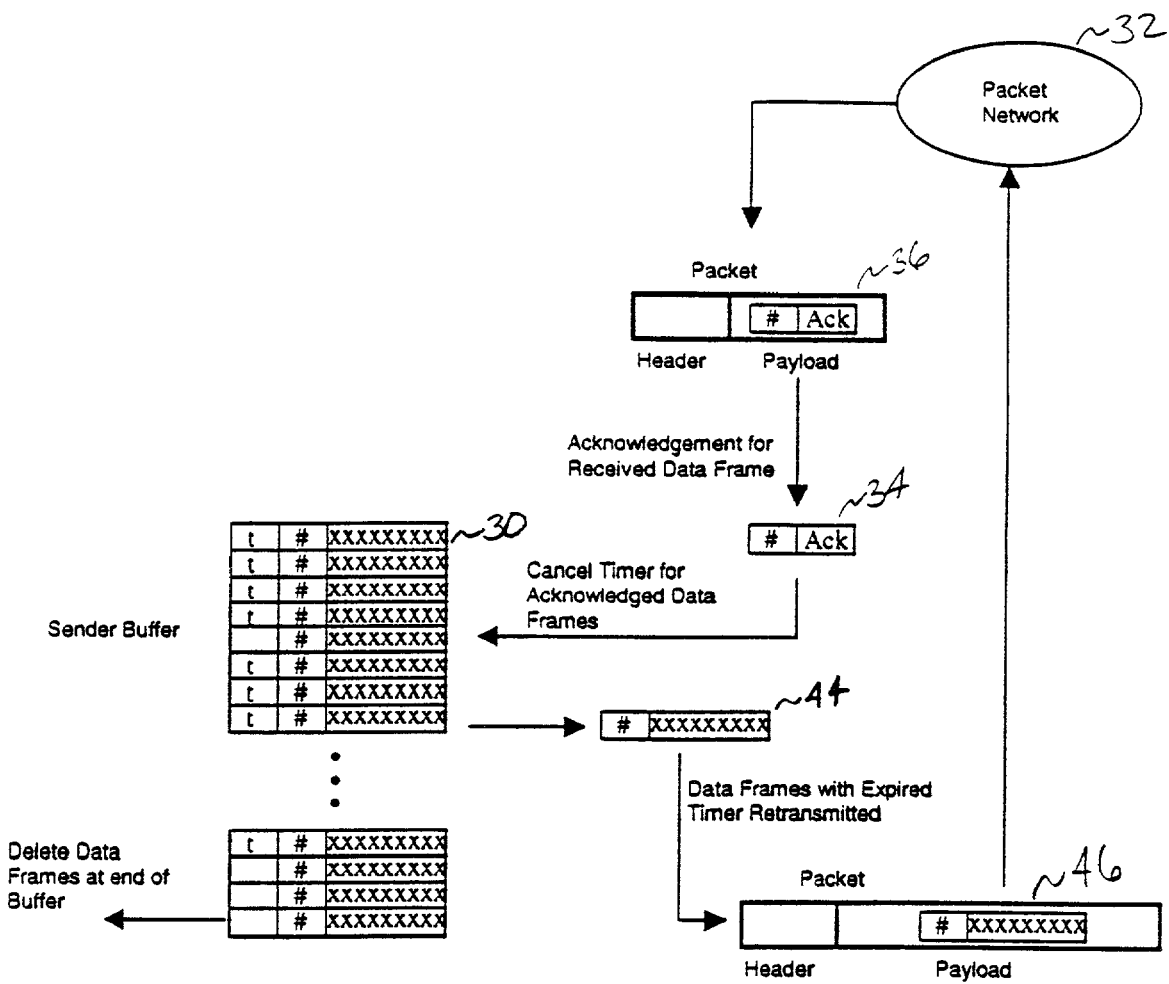
FIG. 4 is a diagram of the present invention illustrating the processing of acknowledgements and expired timers.

As illustrated in FIG. 4, when the data frame timer has expired, and either no acknowledgement or a negative acknowledgement has been received, the data frame 44 is re-sent in a new packet 46. If an acknowledgement 34 has arrived prior to the timer expiring, the timer is cancelled, as there is no need to retransmit that data frame.

By trading off additional delay, additional robustness can be added to the system by increasing the number of times a data frame is retransmitted. This implies that on the sending side, when a data frame is retransmitted, the timer is reset again. When the second timer expires, there is a new attempt at transmitting the data frame. The timer can be reset for the number of times equal to the number of desired retry attempts. On the receiving side, the buffer size needs to be increased accordingly, in order to allow sufficient time for the multiple attempts at the transmitting side to reach the receiving side.

Preferably, the parameter values used in the present system are determined according to the following:

Retransmit timer>#Retransmits*(2*Transmission Delay+Processing Time)

Buffer Time Length>Retransmit Timer

Buffer Size=(Buffer Time Length)/(Frame Size)

System Delay=Frame Size+Buffer Time Length

Once a circuit is established, it is generally not possible to change the buffer size without disrupting the TDM data flow. Reducing the buffer would require discarding data frames for a brief duration equal to the size of the reduction of the buffer size. Increasing the buffer would require the transmission of empty data frames for a brief duration equal to the size of the increase of the buffer size.

There are a number of parameters that may be configured in the present system. The setting of these parameter values can in turn affect the performance and robustness of the system. By monitoring several performance measurements in the system, the configurable parameters may be modified in order to improve the system performance. For example, if there are a large number of occurrences of data frame timers expiring prior to the receipt of acknowledgements, this condition would indicate that it may be desirable to increase the timer value being used and the length of the receive buffer. On the other hand, if there is a high average time between when acknowledgements are received and the time remaining on the date frame timer, then it may be possible to shorten the length of the timers and the size of the receive buffer. This would reduce the delay introduced by the system.

In another network scenario, there may be a high average time between when acknowledgements are received and the time left on the data frame timers. If, in addition, there is still a high number of retransmits required, this may indicate that the network is experiencing lost or corrupted packets. Therefore, in order to increase reliability, the number of retry attempts should be increased.

The present invention may be advantageously applied to different sized TDM data streams such as DS0, fractional T1/E1, T1/E1, T3/E3, etc. The frame size should be adjusted accordingly. In addition, the present method and system can work with any type of packet network on which the TDM data stream is transported, i.e., IP, ATM, Frame Relay, etc.

Frame packing techniques may be applied to improve bandwidth efficiency on the network. Frames from multiple TDM data streams are packed into a common transport packet. The receive buffer then stores each packet, and when the packet reaches the end of the buffer, each individual frame is then piped to the appropriate TDM data stream.

In voice over packet systems, full frames of speech are sometimes not sent during periods of silence (called silence suppression). This technique reduces the bandwidth required for transmission of the data. Similar concepts can be applied to the transport of TDM data over packet networks. Often, the TDM data link between two data applications is idle. In a dedicated circuit environment, this unused bandwidth cannot be easily utilized by other applications. However, if the transport is done over a packet network, greater efficiencies can be realized. The important factor is that TDM data streams at the receive side expect a steady data input stream. The following solution provides a constant data stream at the receive side, while at the same time minimizing the data transported across the packet network when the data transmission path is idle.

Figure 5:
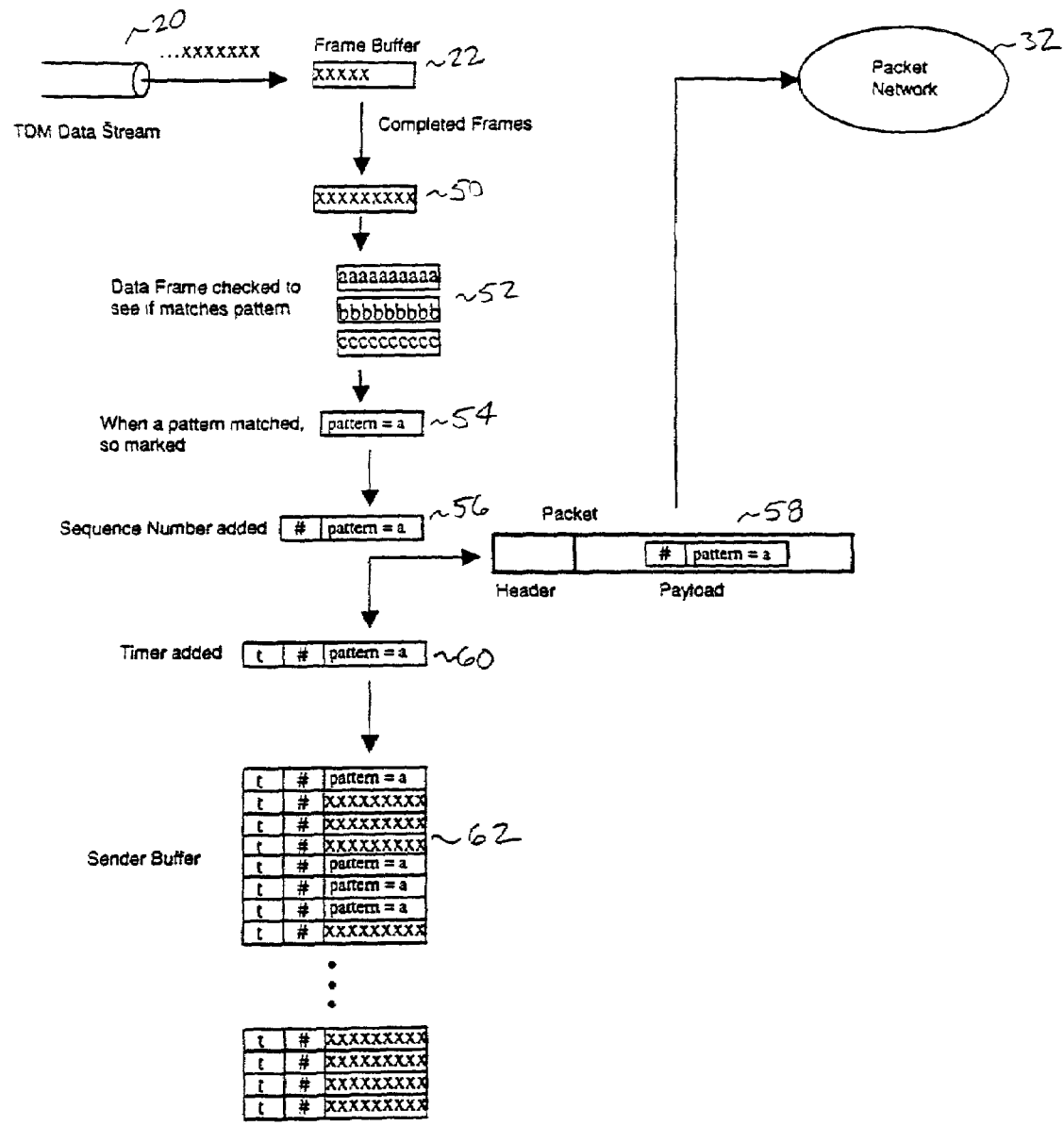
FIG. 5 is a diagram of an alternative embodiment of the present invention illustrating the processing of TDM data for transmission over a packet network.

First, as shown in FIG. 5, if a frame of data 50 matches a pre-defined null set pattern 52 (i.e. all 0s or all 1s, or alternating 1s and 0s), then the data is not sent. Instead, a message 54 indicating that the data for the frame to be regenerated at the terminating side is one of the predefined patterns 52. Then, a sequence number is added to form data frame 56. A packet 58 is formed using this data frame as payload and sent to packet network 32. Also, a timer is added to the data frame, shown as 60, and a copy is stored in a sender buffer 62.

For example, assume that a frame is determined to be all 1s. Then, instead of a data frame of 1s being sent, the data frame has a flag set indicating that there is no frame full of data, but rather the data has been recognized to match the all is pattern. A second field in the packet indicates which one of the patterns has been matched. In this case, the all 1s pattern has been matched. A code would designate pattern types (i.e. 01 represents all 1s, 10 represents all 0s, etc.).

At the receiving end, each data frame is checked to see whether or not the pattern flag is set. If so, then the pattern type is examined to determine which data frame should be regenerated for the TDM data stream. This process occurs when the frame reaches the end of the receive buffer. The previously described retry mechanism applies the same to the patterned matched frames, as it does for the data filled frames.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, microdrive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for transporting a Time Division Multiplexed (TDM) data stream over a packet network, the method comprising:
   on a sending side:
      buffering an input TDM data stream until a data frame is filled;
      assigning a sequence number to the data frame;

sending the data frame in a packet across the packet network to a receiving side;
computing and setting a timer corresponding to the data frame;
storing a copy of the data frame in a sending side buffer;
on the receiving side:
receiving the packet and removing the data frame;
sending an acknowledgement frame in an acknowledgement packet to the sending side;
buffering received data frames in a sequence order in a receive buffer; and
sending a data frame with a lowest sequence number to an output TDM data stream;
wherein if an acknowledgement frame is not received at the sending side before an expiration of the timer, a copy of a corresponding data frame stored in the sending side buffer is resent to the receiving side; and
wherein a length of the timer and a size of the receive buffer is automatically decreased if, when an acknowledgement is received, a running average of the time remaining on the timer is greater than a predetermined threshold.

2. The method of claim 1, wherein a length of the timer is increased if a number of data frame timers expiring prior to the receipt of acknowledgements is greater than a predetermined threshold.

3. The method of claim 1, wherein the timer is initially set to a time greater than or equal to twice a round-trip transmission delay plus any processing delay at the receiving end.

4. The method of claim 1, wherein after a data frame is sent, a next data frame is processed as soon as it is filled with data from the data stream.

5. The method of claim 1, wherein the timer is reset following a retransmission of a data frame.

6. The method of claim 4, further comprising storing a null set frame for a missing frame in the receive buffer, and sending the null set frame to the output TDM data stream if a copy of the missing frame is not received before the null set frame has the lowest sequence number in the receive buffer.

7. The method of claim 6, further comprising:
tracking the sequence numbers of the data frames received on the receiving side; and
sending a negative acknowledgement to the sending side if a predetermined number of frames are received after a missing frame;
wherein the sending side retransmits a copy of the missing frame upon receipt of the negative acknowledgement, even if the corresponding timer has not expired.

8. The method of claim 6, further comprising checking if a filled data frame matches a predetermined pattern, and if so, sending a coded frame corresponding to the matched-predetermined pattern instead of the data frame, and recreating the matched predetermined pattern on the receiving side upon receipt of the coded frame.

9. A network system comprising:
an input Time Division Multiplexed (TDM) data connection;
a packet network;
an output TDM data connection;
a sending side comprising a sending side TDM data to packet data converter module connected between the input TDM data connection and the packet network;
a computer-readable medium encoded with software to be executed by the sending side module for:
buffering the input TDM data stream until a data frame is filled;
assigning a sequence number to the data frame;
sending the data frame in a packet across the packet network to a receiving side;
computing and setting a timer corresponding to the data frame; and
storing a copy of the data frame in a sending side buffer;
the receiving side comprising a receiving side packet to TDM converter module connected between the packet network and the output TDM data connection; and
a computer-readable medium encoded with software to be executed by the receiving side module for:
receiving the packet and removing the data frame;
sending an acknowledgement frame in an acknowledgement packet to the sending side converter module;
buffering received data frames in a sequence order in a receive buffer; and
sending a data frame with a lowest sequence number to the output TDM data connection;
wherein if an acknowledgement frame is not received at the sending side converter module before an expiration of the timer, a copy of a corresponding data frame stored in the sending side buffer is resent to the receiving side converter module;
wherein after a data frame is sent, a next data frame is processed on the sending side as soon as it is filled with data from the input TDM data connection; and
wherein a length of the timer and a size of the receive buffer is automatically decreased if, when an acknowledgement is received, a running average of the time remaining on the timer is greater than a predetermined threshold.

10. The system of claim 9, further comprising computer-readable medium encoded with software to be executed by the receiving side converter module for converter module for storing a null set frame for a missing frame in the receive buffer, and sending the null set frame to the output TDM data stream if a copy of the missing frame is not received before the null set frame has the lowest sequence number in the receive buffer.

11. The system of claim 10, further comprising computer-readable medium encoded with software to be executed by the receiving side converter module for:
tracking the sequence numbers of the data frames received on the receiving side; and
sending a negative acknowledgement to the sending side if a predetermined number of frames are received after a missing frame;
wherein the sending side converter module retransmits a copy of the missing frame upon receipt of the negative acknowledgement, even if the corresponding timer has not expired.

12. The system of claim 11, further comprising:
computer-readable medium encoded with software to be executed by the sending side converter module for checking if a filled data frame matches a predetermined pattern, and if so, sending a coded frame corresponding to the matched predetermined pattern instead of the data frame;
computer-readable medium encoded with software to be executed by the receiving side converter module for recreating the matched predetermined pattern on the receiving side upon receipt of the coded frame.

13. A Time Division Multiplexed (TDM) data to packet data converter module in a sending side comprising:
a processor; and a computer-readable medium encoded with software to be executed by the processor for:
buffering an input TDM data stream until a data frame is filled;
assigning a sequence number to the data frame;
sending the data frame in a packet across a packet network to a receiving side;
computing and setting a timer corresponding to the data frame;
storing a copy of the data frame in a sending side buffer, and
receiving acknowledgement frames sent from the receiving side;
wherein if an acknowledgement frame is not received at the sending side before an expiration of the timer, a copy of a corresponding data frame stored in the sending side buffer is resent to a receiving side, and wherein after a data frame is sent, a next data frame is processed as soon as it is filled with data from the data stream; and
wherein a length of the timer and a size of the receive buffer is automatically decreased if, when an acknowledgement is received, a running average of the time remaining on the timer is greater than a predetermined threshold.

14. A packet data to Time Division Multiplexed (TDM) data converter module in a receiving side comprising:
a processor; and
a computer-readable medium encoded with software to be executed by the processor for:
receiving a packet from a sending side and removing a data frame;
sending an acknowledgement frame in an acknowledgement packet to the sending side;
buffering received data frames in a sequence order in a receive buffer; and
sending a data frame with a lowest sequence number to an output TDM data connection;
wherein if an acknowledgement frame is not received at the sending side before an expiration of a timer, a copy of a corresponding data frame stored in a sending side buffer is resent to the receiving side; and
wherein a length of the timer and a size of the receive buffer is automatically decreased if, when an acknowledgement is received, a running average of the time remaining on the timer is greater than a predetermined threshold.

* * * * *